United States Patent [19]

Kudo et al.

[11] 4,144,358

[45] Mar. 13, 1979

[54] PREPARATION OF A CHEESE FOOD

[75] Inventors: Shiro Kudo, Ito; Keizo Ishino; Kunihisa Akaba, both of Iida, all of Japan

[73] Assignee: Asahimatsu Koridofu Kabushiki Kaisha, Nagano, Japan

[21] Appl. No.: 804,435

[22] Filed: Jun. 7, 1977

[30] Foreign Application Priority Data

Jun. 11, 1976 [JP] Japan .................................. 51-68409

[51] Int. Cl.$^2$ ............................................. A23C 19/12
[52] U.S. Cl. ..................................... 426/582; 426/634
[58] Field of Search ................................ 426/582, 634

[56] References Cited

U.S. PATENT DOCUMENTS 3,694,219  9/1972  Glandorf et al. ..................... 426/634
3,741,774  6/1973  Burkmall, Jr. ....................... 426/582
3,901,978  8/1975  Nelson et al. ..................... 426/634 X

FOREIGN PATENT DOCUMENTS 1434298  5/1976  United Kingdom.

*Primary Examiner*—David M. Naff
*Attorney, Agent, or Firm*—Toren, McGeady and Stanger

[57] ABSTRACT

A cheese-like food containing the total ingredients of soybeans is produced by forming a mixture of natural cheese and crushed whole soybeans which have been heated to denature protein and to deactivate trypsin inhibitor and hemaglutanine, agitating the mixture, and fermenting the agitated mixture by the enzymatic action of microorganisms in the natural cheese. The cheese-like food is free from soybean odor and has taste and texture of cheese.

5 Claims, No Drawings

PREPARATION OF A CHEESE FOOD

BACKGROUND OF THE INVENTION

1. Field of the Invention

The present invention relates to a process for producing a cheese-like food which contains the total ingredients of soy-beans, and intends to provide a cheese-like food which is free from soy-bean odor and excellent in taste and texture.

2. Description of Prior Art

So far various methods have been proposed for producing so-called soy-bean cheese using soy-beans as raw material. In fact, however, the essential ingredient was soy-bean protein curd which was obtained from the whole soy-beans by removing extra materials. But the product was unsuited to practical use for food because of the remaining soy-bean odor and other properties inferior to those of natural cheese such as emulsion stability, melting property and the color.

During their investigations the present inventors found (1) that a soy-bean steep liquor, produced in the same way as corn steep liquor, and a residual liquor that occurred when "tofu" (a favorite Japanese food prepared from soy-bean) was precipitated from bean milk by using a coagulator contained some ingredients which were very effective for the growth of microorganisms; and (2) that the solid matter called "okara" in the remainder of the squeezed soy-beans favorably affected the emulsion stability, with which soy-bean protein was concerned, so as to avoid separation of the oily components, even on heating or standing. Conventionally it has been believed that the residual liquor causes the soy-bean odor and the presence of "okara" is not favorable to produce a good texture. To the contrary, the present inventors attempted to utilize these components.

SUMMARY OF THE INVENTION

This invention has been developed based on the above mentioned facts. Thus, the total ingredients of crushed soy-beans in the form of paste or powder were mixed with the natural cheese. Those substances in the residual liquor that accelerate fermentation actually accelerate the fermentation or enzymatic reactions of microorganisms in the natural cheese, decompose those compounds which cause soy-bean odor and flatulence to convert the good tasting components of soy-bean into those of cheese, while compounds in the "okara" effectively act to stabilize the emulsion system to assimilate both texture and flavor with those of natural cheese. In this process the thermal melting property can also be provided.

In other words, the total ingredients of soybeans may be divided into three divisions, that is, "tofu," "okara" and the residual liquor when expressed in accordance with the process of producing "tofu". The characteristics of the three materials are fully utilized to produce the flavor, texture and emulsion stability of the final products, which are in no respect inferior to the natural cheese. Therefore this invention is entirely different from previous ones in the components of raw materials and also in principle. Neither waste liquid nor "okara" is produced in this invention. This additional feature is useful to reduce the manufacturing cost and the pollution problem. The simplified process for producing cheese-like foods is also economical. An additional feature is disappearance of the flatulence components due to fermentation of sugars in the soy-bean.

DETAILED DESCRIPTION OF THE INVENTION

The present invention will be described in more detail.

At first, it is necessary to prepare paste or powder that contains the total ingredients of soy-beans. Whole soy-beans or degreased soy-beans (including those when skins are removed) may serve as the starting material. In the production of a paste or powder, the operations of swelling, heating and crushing may be conducted in any sequence. Important are that the protein is thoroughly denatured on heating and that the physiologically interfering substances, such as trypsin inhibitor and hemaglutanine are deactivated in the soy-bean paste or powder. The heating may be performed by boiling or steam heating, but the latter is preferred because the fermentation accelerating substances may dissolve on boiling. The period and the temperature of heating should be selected according to the moisture content and dimensions of the beans. Crushing may be performed with a colloid mill, but a high pressure homogenizer is better to obtain a smoother texture. The paste thus prepared is then mixed with natural cheese and subject to aging for an appropriate time at a selected temperature. A powder may be added to the cheese either directly or after it has been turned into a paste with water. Any cheese may be used, put penicillium cheeses are preferred, such as, blue cheese and cammenvale cheese. Additives, such as, oil, molten salt, kitchen salt, and flavor may be added either on mixing or after the aging treatment. The period of aging is different depending on the degree of ripening of the natural cheese and the species of soy-beans, and therefore should be determined by the human senses rather than chemical analysis of the raw material. It is preferable to age the mixture at a temperature not higher than 15° C. for at least one week. The ratio of bean to cheese on mixing should also be decided to an appropriate value (at least about 1% by weight of cheese) that depends on the kind of cheese.

After the aging period, the resulting material is stirred at 80°-100° C. for an adequate time and then moulded under sterilized conditions to assure good preservative property.

The soy-bean cheese prepared in the mentioned process provides an excellent cheese-like food having appropriate melting property on heating and long-preserved good taste and touch.

DESCRIPTION OF PREFERRED EMBODIMENT:

The present invention will be more clearly understood from the following examples. The "part" used herein means "part by weight."

EXAMPLE 1

Thoroughly soaked whole grains of soy-bean were heated for 5 min. in hot water. After being cooled, they were stripped off the skins, and crushed after most of the water was removed. A mixture consisting of 40 parts of the above material, 60 parts of natural cheese, 15 parts of a hardened oil, 2.5 parts of molten salt, and 0.8 part of kitchen salt was agitated for 20 min. at a temperature of 35° C. The resulting material was moulded and then subjected to aging at 5° C. for a period of 2 months. After the full period, it was agitated for 20 min. at 80° C. and loaded in a film bag under a sterilized condition.

A comparison test was conducted of the present product with a commercial process cheese of the hard type by 30 persons for the test panel. However, no significant difference was observed between them. The product cheese-like food remained unchanged for 6 months when kept at 25° C. and melted on heating.

EXAMPLE 2

Thoroughly soaked whole grains of soy-bean were heated for only 10 sec. at 5 atm., skins and most of the water was removed and then they were crushed. Water was added to be up to 72% of the resulting mixture, which was further ground in a high pressure homogenizer under a pressure of 200 atm. 50 parts of the mixture was mixed with 50 parts of natural cheese and the whole mixture was agitated for 20 min. at 40° C. to assure homogenuity, moulded and then subjected to aging for a full month at 10° C. After the period, 15 parts of hardened oil, 2.5 parts of molten salt and 1.0 part of kitchen salt were added. The whole mixture was agitated for 20 min. at 90° C., and loaded under a sterilized condition in a film bag.

The product obtained revealed high quality of dipsersion in the mouth and was free from bean odor. In a comparison test of the product with a commercial hard type process cheese, 30 persons of the test panel did not find any significant difference between them. This product remained unchanged for 6 months when kept at 25° C. and it readily melted on heating.

EXAMPLE 3

Thoroughly soaked whole grains of soy-bean from which most of the water was removed were crushed, and made up in thin layers with a roller. The obtained material was heated uniformly with steam for 30 min. and then dispersed under 200 atm. with a high pressure homogenizer. 99 parts of the product were treated under agitation with 1 part of blue cheese and 3 parts of kitchen salt for 20 min. at 35° C., moulded. Holes were drilled with appropriate intervals between them, and the product was subjected to aging for 2 months at 10° C. just in the same way as for producing blue cheese. The final product obtained had very similar taste and texture to those of blue cheese.

EXAMPLE 4

Thoroughly soaked grains of whole soy-bean were crushed together with 10 parts of water, steam-heated for 3 min., coagulated by treating with calcium chloride, and the solid matter was separated from the waste liquid. The curd thus obtained was treated with a centrifuge to reduce the water content to 65%. On the other hand, the waste liquid was concentrated to a tenth in volume. A mixture of the curd and the waste liquid of which the water content was made to be 72% was treated with a high pressure homogenizer under 200 atm. A mixture consisting of 60 parts of the above product and 40 parts of natural cheese was agitated for 20 min. at 40° C., moulded, and then subjected to aging for 3 weeks at 15° C. After the period, 20 parts of salad oil, 2.5 parts of molten salt and 1.2 parts of kitchen salt were added. The resulting mixture, after it was heated to 95° C. for 20 min. under agitation, was loaded in a film bag under a sterilized condition.

The final product was very soft even at a low temperature and melted smoothly in mouth. A test panel consisting of 30 persons could not find any significant difference between the present product and a commercial process cheese in comparison. This product remained unchanged for 6 months when kept at 25° C.

EXAMPLE 5

A sample of degreased soy-beans was mixed with water to be 65% of water content, rolled in layers with a roller, treated by uniform heating with steam for 30 min. To 70 parts of the crushed matter obtained above were added 30 parts of natural cheese, 30 parts of salad oil, 2.5 parts of molten salt, and 1.4 parts of kitchen salt. The mixture thus obtained was agitated for 20 min. at 40° C., moulded, and subjected to aging for 2 weeks at 200° C. At the end of the period, the resulting matter was agitated at 80° C. for 20 min. and loaded under a sterilized condition. The product thus obtained was soft and spreadable, softer than commercial soft type ones even at a low temperature. In a comparison test by 30 persons of the test panel, no difference from commercial spreadable type process cheese was noticed. Further, the product remained unchanged for 6 months at 25° C.

EXAMPLE 6

Whole grains of soy-bean were crushed, rolled in thin layers with a roller, and steam heated for 30 min. A mixture consisting of 20 parts of the above matter, 30 parts of water, 50 parts of natural cheese, 15 parts of hardened oil, 2.5 parts of molten salt, and 1.0 part of kitchen salt was made homogeneous by agitation for 60 min. at 45° C. This was moulded and subjected to aging for 5 days at 25° C. The resulting matter was agitated for 20 min. at 90° C., then loaded in a film bag under a sterilized condition. In a comparison test with commercial hard type process cheese carried out by 30 persons of test panel, the product of the present invention was not significantly different. It could be preserved at least for 6 months in a stable condition when kept at 25° C., and was readily melted on heating.

In the above six examples, oligosaccharides, to which flatulence is believed to be due in soy-beans, were determined by the usual method of analysis. However, it was found in either case that oligosaccharides gradually disappeared during the course of aging, and were reduced to a trace amount at the end of the aging.

What is claimed is:

1. A process for producing food comprising mixing crushed whole soybeans, the protein of which has been thoroughly denatured by heating and the trypsin inhibitor and hemaglutanine therein have been deactivated, with natural cheese, to produce a mixture containing from 20 to 99 parts soybeans and from 1 to 60 parts natural cheese, agitating the mixture for a time period of 20–60 minutes at a temperature of 35° to 45° C., and fermenting the mixture by the enzymatic reactions of micro-organisms in the natural cheese for a period of 5 days to 2 months at a temperature of 5° to 25° C.

2. The process according to claim 1 in which the soybeans are in the form of paste.

3. The process according to claim 1 in which the soybeans are in the form of powder.

4. The process according to claim 1 in which the soybeans are degreased soybeans.

5. The process according to claim 1 which further comprises stirring and heating the fermented mixture at 80° to 100° C.

* * * * *